Nov. 8, 1966    C. W. MERCHANT    3,283,588
ROTATIONAL SPEED SENSOR CONTROL UNIT
Filed Dec. 16, 1963

INVENTOR.
CHARLES W. MERCHANT
BY WATTS & FISHER

ATTORNEYS

INVENTOR.
CHARLES W. MERCHANT
BY WATTS & FISHER
ATTORNEYS

3,283,588
ROTATIONAL SPEED SENSOR CONTROL UNIT
Charles W. Merchant, Lake County, Ohio, assignor to Euclid Electric & Manufacturing Co., Madison, Ohio, a corporation of Ohio
Filed Dec. 16, 1963, Ser. No. 330,848
8 Claims. (Cl. 73—507)

The present invention relates broadly to control units and more particularly to a control unit which utilizes an existing rotary motion or signal to linearly perform a control function.

The present control unit has particular application for operating a control device such as a valve or a switch from a remote or inaccessible location or in conjunction with an existing signal, operating shaft or power source. In one form of the present control unit, a pair of magnets are arranged face-to-face and mounted on supports for relative movement between mutually attractive and mutually repulsive positions. The magnets are also mounted for movement between adjacent and away relative positions when the magnets are in mutually attractive and repulsive relations respectively. The magnets when unrestrained are normally in the adjacent, mutually attractive relation. By restraining one magnet while moving the other so that the magnets are placed in a mutually repulsive relation they may be caused to move themselves and their supports to the away or separated relative position. A switch or other control device may be operatively connected to the magnet supports and operated by the relative movement of the magnets when moving between their away and adjacent positions.

In a preferred form of the present invention, the magnets are face or ring magnets having multi-pole faces or edges. Both magnets are mounted on their supports for rotatable movement and one magnet is also mounted on its support for axial movement. By restraining the rotation of one magnet while rotating the other magnet, it is possible to secure an attraction or repulsion in substantially a direct relationship to the angular movement of their north-south pole configurations.

The present control unit is particularly useful for operating a control switch or other device by using the rotation or other movement of the apparatus to be controlled or monitored. In other words, by restraining or governing the rotation of one magnet while the other magnet is rotated by the apparatus to be controlled, the magnets may be selectively caused to separate or move together to operate a switch or valve in the control or energizing circuit of the apparatus. The latter arrangement of the magnets may also be used as a speed sensing device by restraining rotation of the one magnet to a predetermined rotational speed and monitoring the separation of the magnets or the periods of separation depending on the ratio of the predetermined and sensed speeds.

Accordingly, an object of the present invention is to provide a new and improved control unit for operating a control device in a predetermined linear direction from a drive moving in other than said linear direction.

Another object of the present invention is to provide a new and improved control unit for selectively converting a rotary motion to a linear motion in a direction axial to the plane of rotation by utilizing the magnetic forces of magnets arranged in face-to-face relation.

Still another object of the present invention is to provide a new and improved control unit wherein the control unit has rotatably mounted magnets arranged in face-to-face relation to impart a linear motion to at least one of the magnets by controlling relative rotation of the magnets.

Yet another object of the present invention is to provide a control unit having co-axially aligned multi-pole rotating ring magnets which operate a control device by applying a braking or governing force to one magnet while the other magnet is rotated by the device to be controlled or monitored.

Further objects of the invention reside in the simplicity with which the parts are arranged, which are economic of manufacture and designed for ready assembly.

Other objects and advantages more or less ancillary to the foregoing objects, and the subject matter to which all the various objects are described will appear in the following description, which considered in connection with the accompanying drawings, sets forth the preferred embodiment of the invention.

Figure 1:
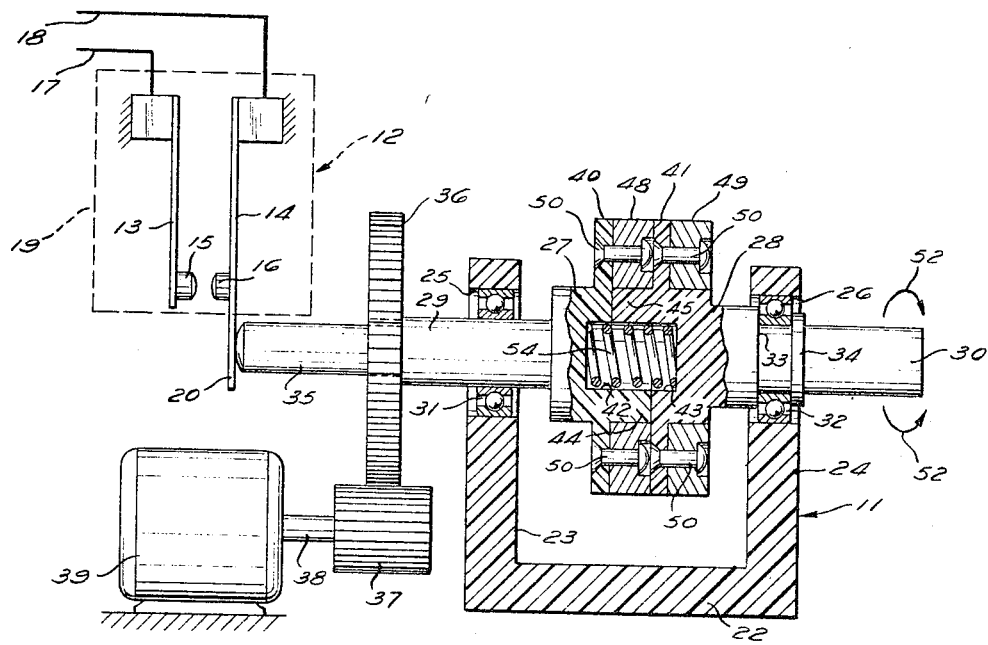
FIGURE 1 is a somewhat schematic view, with parts shown in cross-section, of the control unit of the present invention.

Referring now to the drawings, a control unit actuating device 11 is shown for actuating a control unit 12. The control unit 12 includes a pair of spaced contact elements 13, 14 having the normally separated or open contact points 15, 16. Conductors 17, 18 are connected to the contact elements 13, 14 and extend out of a control unit housing indicated by the broken line 19 for connection to and control of any suitable unit. The contact element 14 has an extended end 20 which extends outside of the housing 19 and serves as an actuator for moving the contact points 15, 16 from their normally open position shown in FIGURE 1 to a closed position as is shown in FIGURE 2.

The control unit actuating device 11 includes a base or frame 22 having two parallel support members 23, 24 in which are provided axially aligned openings 25, 26. A pair of magnet support members 27, 28 are provided and include shaft portions 29, 30 which are rotatably journaled in the openings 25, 26 by means of anti-friction bearings 31, 32. The magnet support members and the frame 22 are preferably of a non-magnetic material. In the preferred form shown, the magnet support members 27, 28 are a synthetic plastic material.

The support members 27, 28 are axially co-extensive and rotate about a comon axis of rotation. The anti-friction bearing 32 has its inner race positioned between a shoulder 33 and a flange 34 of the shaft portion 30 so that the magnet support member 28 is fixed against axial movement relative to the frame 22. The shaft portion 29 is slidably carried by the anti-friction bearing 25 so that the magnet support member 27 is movable linearly or axially as well as rotatably. The shaft portion 29 includes an extended shaft end 35 which engages the extended end 20 of the actuator element 14. A gear 36 is fixed to the extended shaft end 35 and is meshed with a smaller pinion gear 37. The pinion gear 37 is fixed to the shaft 38 of a rotational speed control unit 39. The pinion gear 37 is sized in length sufficiently to accommodate relative linear movement of the gear 36. The function of the rotational speed control unit 39 is to govern or regulate the rotational speed of the shaft 29 when the shaft 28 is driven in either rotational direction by a suitable prime mover indicated schematically by the arrows 52. Examples of suitable speed control units are a centrifugal brake, an escapement such as in a clock works timer, a fluid impedance, or a constant speed drive as for example a synchronous motor.

The magnet support members 27, 28 further include the radially extending flanges 40, 41, the axially extending center bores 42, 43 and cog projections 44 and 45 circumferentially positioned in equidistant spaced relation around the center bores 42, 43 respectively. The three cog projections 44 on one magnet support member 27 intermesh with the three cog projections 45 on the other magnet support members 27, 28 between predetermined angular limits.

Annular magnets 48, 49 are provided and are secured to the flange portions 40, 41 respectively by the fasteners 50. The annular magnet members 48, 49 may be either face or ring magnets having two or more poles around its face or outer circumferential edge. In the preferred embodiment shown, face magnets are provided and have four north poles and four south poles for a total of eight poles. The annular magnet members 48, 49 are arranged in face-to-face relation and will either attract or repel each other depending upon the relative positions of their north and south poles. When the north pole on one magnet is opposite the south pole on the other magnet, then the attractive force between the two magnets is the strongest in the conventional manner. When like poles are opposite each other so that the two magnets are placed in a north-to-north and in south-to-south positions, then the repulsion between them is the strongest. Thus, by causing one of the magnets to rotate at a predetermined speed, and restraining or otherwise controlling the rotational speed of the other magnet, the two magnets may be caused to rotate relative to one another so that they move from their mutual position of maximum attraction towards the position of maximum repulsion. The repulsive force between the magnet members tends to drive them apart and since the magnet support member 27 is free to move axially, its shaft portion 29 moves axially relative to the frame 11 moving the contact element 14 to cause the contact points 15, 16 to close.

Figure 2:
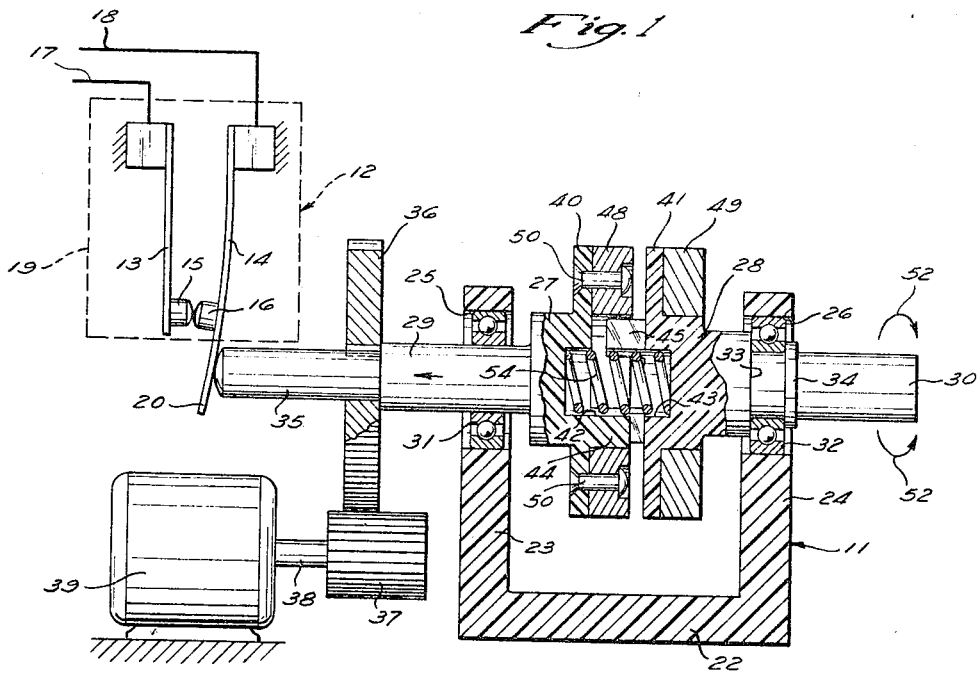
FIGURE 2 is a view similar to FIGURE 1 and shows the control unit in a different, operative position than is shown in FIGURE 1; and, FIGURE 3 is an exploded, perspective view of the ring magnets and their supports as taken from the control unit shown in FIGURE 1.
Figure 3:
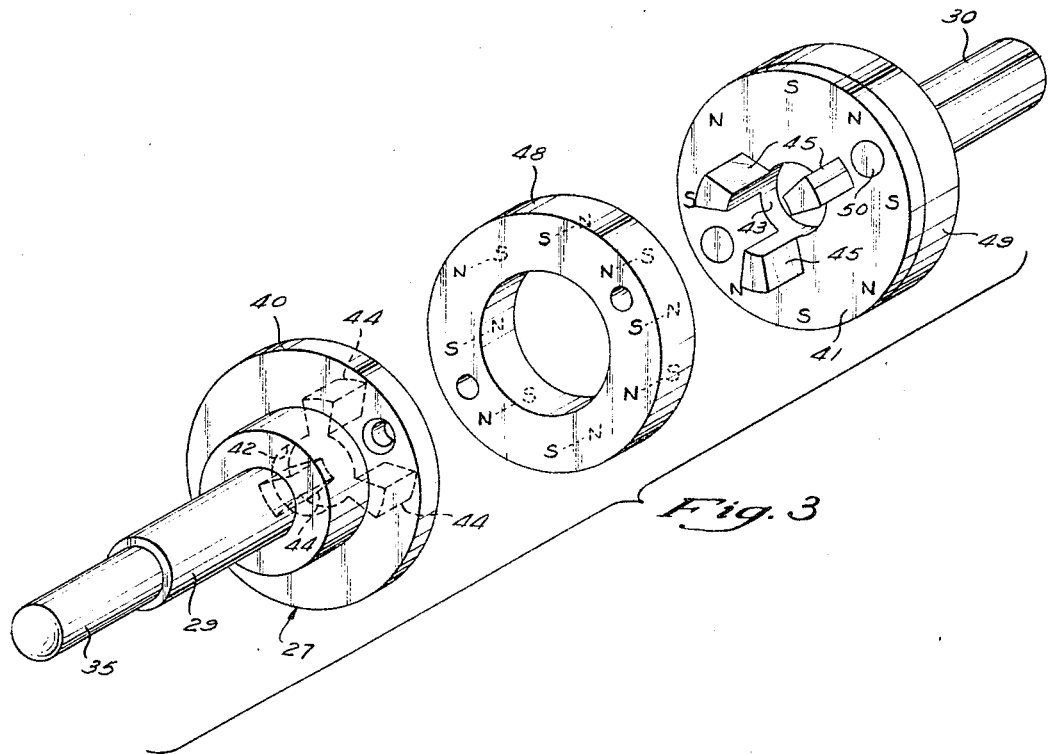

As shown in FIGURES 1 and 2, a spring 54 is disposed in the center bores 42, 43 of the magnet support members 27, 28. When the magnet members 48, 49 are in a north-to-south attitude they are in their position of maximum attraction and are closely adjacent as shown in FIGURE 1. The spring 54 is compressed and its restoring force urges the magnets 48, 49 to separate. The restoring force of the spring 54 is less or weaker than the attractive force of the magnets 48, 49 when their respective poles are in a north-to-south attitude so that the magnets 48, 49 remain together. The purpose of the spring loading provided by the spring 54 is to secure a movement or reaction linearly or axially in less rotation than the angular distance between two adjacent poles. On the other hand, the restoring force of the spring 54 is greater than the attractive force between the magnets 48, 49 when the magnets move slightly out of the north-to-south attitude. Thus when the magnets rotate relatively, the restoring force of the spring 54 overcomes the attractive force of the magnets 48, 49 and the spring 54 axially moves the movable magnet support member 27 until the support members 27, 28 are at a maximum separation as shown in FIGURE 2. The point of relative magnet rotation at which the spring will overcome the mutual attraction of the magnets depends upon the restoring force of the compressed spring and is between a maximum attraction position where the magnets are in a north-to-south attitude and a position midway between the maximum attraction position and a maximum repulsion position where the magnets are in a north-to-north attitude.

The magnet members 48, 49 arranged in the face-to-face rotatable relation as shown in the drawing, also have a rotational torque which tends to return them to a north-to-south attitude when unrestrained. This rotational torque reaches a maximum at a midpoint between maximum attraction and maximum repulsion whereas, at this midpoint, the linear force between the magnet members is zero, there being neither an attractive nor a repulsive force between them. If the magnet members are relatively rotated to the point of maximum repulsion, then there is no rotational restoring torque which rotational restoring torque is needed to assure that the magnet support member 27 will move toward the magnet support member 28 to release the switch 14 when the rotational forces applied to the shaft portions 29, 30 no longer differ and require such movement. This problem is overcome by the spring 54 which secures an axial reaction or movement after slight relative magnet rotation and by the cog projections 44, 45 which limit relative magnet rotation.

When the magnet members 48, 49 are in a north-to-south attitude and are at the point of maximum attraction, the cog projection on one magnet support member is located circumferentially intermediate the two adjacent cog projections on the other magnet support member. The size and spacing of the cog projections is such that there is approximately 30% rotation between the magnet support members 27, 28. Since there are a total of eight poles on each magnet face, then there are four matching positions of strongest mutual attraction which are 90° apart. The cog projection spacing is such that the two magnets 48, 49 may move in either rotational direction less than 45° not quite to the point of maximum repulsion.

The flange portion 41 of the magnet support member 28 is interposed between the magnet members 48, 49. The flange 41 thus provides a minimum predetermined spacing between the magnet members. This predetermined minimum spacing provided by the flange 41 increases the reluctance path between the magnets so that their attractive force is not as great as if the two magnets were in abutting relation. The width or thickness of the flange portion 41 then determines somewhat the amount of maximum attractive force between the two members and consequently the amount of force required to rotate them toward a position of repulsion and consequently to separate them.

In one manner of use of the present control unit actuating device 11, the shaft portion 30 is driven by a suitable prime mover in either direction as shown by the arrows 52 and the rotational speed control unit 39 restrains or otherwise governs and controls the rotational speed of the shaft portion 29. When the rotational speed control unit 39 acts on the shaft portion 29 to cause it to run at a rotational speed differing from that of the speed of the shaft portion 30, then the two magnet members 48, 49 rotate relative to one another from their position of maximum attraction toward a position of maximum repulsion. As soon as they move out of their position of maximum attraction, the spring loading provided by the spring 54 causes them to move immediately away from one another so that the shaft extension 35 pushes the contact element extension 20 to cause the contact elements or points 15, 16 to close. When the rotational speed control unit 39 is then further controlled either to allow the shaft 29 to rotate freely or to rotate positively at the speed of the shaft 30, the rotational restoring torque returns the magnets to a north-to-south attitude and the attractive force between the magnets 48, 49 moves the support member 27 axially away from the actuator extension 20 to open the contact points 15, 16. Thus, the present actuating device can be used to operate a valve, switch or other device by braking or otherwise governing the speed of one magnet support member while the other support member is rotated by the device to be controlled or monitored.

The present invention may be briefly described as an actuating device, particularly for converting rotary motion to linear or axial motion, which device comprises essentially a plurality of magnets rotatably carried in a frame, at least one of the magnets being mounted for linear movement in the frame, drive means for rotating one of the magnets at a first speed, a rotational speed control means operatively connected to a second magnet for controlling its rotational speed, and a control responsive to linear movement of the second magnet so that when the rotational speed of the two magnets is determined by the drive means and the speed control means are caused to differ the magnets move from an adjacent position of maximum attraction towards an away position of maximum repulsion thereby causing the second magnet to move axially. The invention further contemplates biasing means interposed between the magnets to secure relative axial movement in substantially less than full relative magnet rotation between positions of maximum attraction and maximum repulsion.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A control device comprising:
 (a) a frame;
 (b) a pair of magnets rotatably carried by said frame and arranged in face-to-face relation, said magnets being relatively rotatable from a mutually attractive position to a mutually repulsive position;
 (c) at least one of said magnets being axially movable in said frame along the axis of rotation and being axially movable from an adjacent position when said magnets are in their mutually attractive position to an away position when said magnets are in their mutually repulsive position;
 (d) rotation governing means connected to one of said magnets and selectively controlling the rotation of it;
 (e) control means having an actuator operatively connected to said axially movable magnet, said actuator operating said control means from one operative position to another operative position when said axially movable magnet moves from its said adjacent position to said away position; and
 (f) drive means operatively connected to the other of said magnets so as to rotate it whereby a difference in the relative rotational speeds of said magnets as induced in said other magnet by said drive means and controlled in said one magnet by said rotation governing means causes said one magnet to move axially from its adjacent position to its away position thereby actuating said actuator.

2. The device of claim 1, including, in combination:
 (g) resilient means interposed between said magnets and compressed by said magnets when in their adjacent position, and said resilient means having a restoring force less than the force of attraction of said magnets in their mutually attractive position and greater than the force of attraction between said magnets when they are rotated relatively towards their mutually repulsive position.

3. The combination of claim 2, including in combination:
 (h) projection means carried by said magnets and limiting relative rotational movement between said magnets.

4. The combination of claim 3, including in combination:
 (i) a spacer of non-magnetic material carried by one of said magnets and interposed between said magnets to maintain said magnets in a predetermined spaced relation when in their adjacent position.

5. A control device comprising:
 (a) a frame;
 (b) first and second shafts rotatably carried by said frame and arranged in axially co-extensive relation, said shafts comprising a non-magnetic material;
 (c) first and second magnets connected to said first and second shafts respectively, said magnets comprising annular members arranged in side-by-side axially aligned relation and each having a plurality of north and south poles, said magnets as fixed to their rotatably mounted shafts being relatively rotatable between mutually attractive and mutually repulsive positions;
 (d) at least one of said magnet support shafts being axially movable in said frame so that when said magnets are in a mutually attractive position, said one shaft is in a first axial position, and when said magnets are rotated relatively toward a mutually repulsive position the force between said magnets causes the shaft to move axially in said frame toward a second axial position;
 (e) rotational governing means being operatively connected to the axially movable shaft and selectively controlling rotation of said axially movable shaft;
 (f) drive means operatively connected to said first magnet support shaft and driving said support shaft at a predetermined rotational speed;
 (g) said rotational governing means selectively controlling the rotational speed of said axially movable shaft so that when the rotational speed of said axially movable shaft is made to differ from the predetermined speed of the other support shaft the magnets move relatively and the force of repulsion between said magnets causes said one shaft to move from its first axial position to its second axial position; and,
 (h) a control device having an actuator operatively connected to said axially movable shaft and operating said control device from a first operative position to a second operative position when said axially movable shaft moves from its first axial position toward its second axial position.

6. The device of claim 5 including, in combination:
 (i) a spring operatively interposed between said magnet support shafts and being compressed by said support shafts when said one shaft is in its first axial position, and the restoring force of the spring being less than the attractive force between the said magnets when they are in a mutually attractive position and being greater than the attractive force between the magnets when they move slightly from a mutually attractive position toward a mutually repulsive position.

7. The device of claim 6 including, in combination:
 (j) said shafts having inter-engaging, axially extending projections which are equally spaced circumferentially and radially from the axis of rotation of the shafts, a projection on one shaft being circumferentially located intermediate between the adjacent projections of the other shaft when said magnets are in their mutually attractive position, and the projections on said one shaft engaging either of the projections on said other shaft when said magnet moves relatively in either direction towards a mutually repulsive position.

8. The device of claim 7 including, in combination:
 (k) one of said shafts including a circular flange portion being operatively interposed between the faces of said annular magnets and maintaining said annular magnets in a predetermined spaced relationship when they are in a mutually attractive position.

(References on following page)

References Cited by the Examiner

UNITED STATES PATENTS

| | | | |
|---|---|---|---|
| 2,802,913 | 8/1957 | Weiss | 73—507 X |
| 2,829,327 | 4/1958 | Cluwen | 73—519 X |
| 2,929,477 | 3/1960 | Rodriguez et al. | 192—84 |
| 2,966,617 | 12/1960 | Hardway | 73—71.2 X |

FOREIGN PATENTS

| | | |
|---|---|---|
| 580,670 | 8/1959 | Canada. |
| 311,916 | 2/1956 | Switzerland. |

RICHARD C. QUEISSER, *Primary Examiner.*

J. J. GILL, *Assistant Examiner.*